United States Patent
Fukasawa et al.

(10) Patent No.: US 7,247,388 B2
(45) Date of Patent: Jul. 24, 2007

(54) VULCANIZABLE ADHESIVE COMPOSITION

(75) Inventors: Kiyofumi Fukasawa, Fujisawa (JP); Tomohiro Kaise, Fujisawa (JP)

(73) Assignee: NOK Corporation, Tokyo (JP)

( * ) Notice: Subject to any disclaimer, the term of this patent is extended or adjusted under 35 U.S.C. 154(b) by 188 days.

(21) Appl. No.: 10/506,490

(22) PCT Filed: Aug. 27, 2003

(86) PCT No.: PCT/JP03/10829

§ 371 (c)(1),
(2), (4) Date: Sep. 2, 2004

(87) PCT Pub. No.: WO2005/023952

PCT Pub. Date: Mar. 17, 2005

(65) Prior Publication Data

US 2005/0215712 A1   Sep. 29, 2005

(51) Int. Cl.
*C09J 161/10* (2006.01)
*C09J 109/02* (2006.01)

(52) U.S. Cl. .................... 428/460; 428/462; 525/133; 525/139; 525/140; 525/142; 156/331.1; 156/331.2

(58) Field of Classification Search ............... None
See application file for complete search history.

(56) References Cited

FOREIGN PATENT DOCUMENTS

| EP | 0 083 218 | 12/1982 |
|---|---|---|
| EP | 1 221 451 A1 | 1/2002 |
| JP | 63-295691 | 12/1988 |
| JP | 1-168781 | 7/1989 |
| JP | 6-30640 | 1/1994 |
| JP | 7-48426 | 2/1995 |
| JP | 8-302323 | 11/1996 |
| JP | 2003-261850 | 9/2003 |

*Primary Examiner*—David J. Buttner
(74) *Attorney, Agent, or Firm*—Butzel Long

(57) ABSTRACT

A vulcanizable adhesive composition, which comprises 100 parts by weight of phenolxylylene resin or phenolbiphenyl resin, 10 to 1,000 parts by weight of resol-type phenol resin, 0 to 1,000 parts by weight of novolak-type phenol resin, 10 to 1,000 parts by weight of unvulcanized nitrile rubber and 10 to 500 parts by weight of chlorinated polyethylene, is effectively applied to (hydrogenated) nitrile rubber with a nitrile content of 18 to 48%, and has a suppression effect on a decrease in the adhesiveness even if exposed to dip in various cryogenic liquids such as flon gas, polyalkylene glycol, water, etc. for a long time.

8 Claims, No Drawings

VULCANIZABLE ADHESIVE COMPOSITION

TECHNICAL FIELD

The present invention relates to a vulcanizable adhesive composition, and more particularly to a vulcanizable adhesive composition effectively applicable to vulcanization adhesion between a metal and (hydrogenated) nitrile rubber.

BACKGROUND ART

In the adhesion between a metal and nitrile rubber (NBR), adhesives of chlorinated rubber series or novolak-type phenol resin series are used. The adhesive of chlorinated rubber series is not adhesible with a metal, so that a primer of phenol series must be applied thereto beforehand. Furthermore, owing to the high viscosity its applicability is also poor. To obtain better adhesion the primer film must have a thickness of at least 5 μm, causing troubles in case of parts requiring dimensional precision, fitting parts, or the like. On the other hand, the adhesive of novolak-type phenol series is adhesible only to (hydrogenated) NBR with a nitrile content of 30 to 40%, so that the applicable rubber range is limited, and also the adhesive contains hexamethylenediamine as a curing agent, causing troubles of gas generation during the drying and baking to foul the drier inside. Furthermore, all of these adhesives have a low resistance to various cryogenic liquids such as flon gases, water, PAG (polyalkylene glycol), etc., resulting in difficulty in application to cryogenic liquid sealing.

To solve these problems, the present applicant previously proposed a vulcanizable adhesive composition comprising a resol-type phenol resin, unvulcanized NBR, chlorinated polyethylene, etc. as essential components (JP-A-6-306340 and JP-A-8-302323). However, the proposed vulcanizable adhesive composition can give a good adhesion to (hydrogenated) NBR with a nitrile content of less than 30%, but still fails to show a good adhesion to (hydrogenated) NBR with a nitrile content of 40% or more, and has a better resistance to various cryogenic liquids than that of the afore-mentioned adhesives of chlorinated rubber series or phenol resin series, but still fails to meet the level of current requirement.

DISCLOSURE OF THE INVENTION

An object of the present invention is to provide a vulcanizable adhesive composition for use in vulcanization adhesion between a metal and (hydrogenated) nitrile rubber, which is effectively applicable to (hydrogenated) nitrile rubber with a nitrile content of 18 to 48%, and whose adhesion can be maintained without lowering even if dipped into various cryogenic liquids such as flon gases, polyalkylene glycol, water, etc., for a long time.

The object of the present invention can be attained by a vulcanizable adhesive composition, which comprises 100 parts by weight of phenolxylylene resin or phenolbiphenyl resin, 10 to 1,000 parts by weight of resol-type phenol resin, 0 to 1,000 parts by weight of novolak-type phenol resin, 10 to 1,000 parts by weight of unvulcanized nitrile rubber and 10 to 500 parts by weight of chlorinated polyethylene.

Phenolxylylene resin is a polycondensation product of 1,4-bis(alkoxy-methyl)benzene and phenol or a phenol derivative having at least one methylol group at the 2,4-positions of phenol, and actually commercially available products, for example, MR-7800, etc., products of Meiwa Kasei Co., Ltd., can be itself used in the present invention.

Phenolbiphenyl resin is a polycondensation product of 4,4'-bis(alkoxymethyl)biphenyl and phenol or a phenol derivative having at least one methylol group at the 2,4-positions of phenol, and actually commercially available products, for example, MR-7850, etc., products of Meiwa Kasei Co., Ltd., can be itself used in the present invention.

Phenol resin for use in the present invention is resol-type phenol resin or together with novolak-type phenol resin. Resol-type phenol resin for use for this purpose is a product obtained by condensation reaction between phenols and formaldehyde in the presence of an alkaline catalyst. The phenols for use in the condensation reaction include phenols having two or three replaceable nuclear hydrogen atoms at the o- and/or p-positions in respect to the phenolic hydroxyl group of phenol, p-cresol, m-cresol, p-t-butylphenol, etc., or their mixtures. The alkaline catalyst for use for this purpose includes ammonia, alkaline metal hydroxides, magnesium hydroxide, etc. Resol-type phenol resins produced from a mixture of m-cresol and p-cresol, and formaldehyde are preferably used.

Novolak-type phenol resin for use for this purpose is a product obtained by condensation reaction between phenols and formaldehyde in the presence of an acidic catalyst. The phenols for use in the condensation reaction include phenols having two or three replaceable nuclear hydrogen atoms at the o- and/or p-positions in respect to the phenolic hydroxyl group of phenol, p-cresol, m-cresol, p-t-butylphenol, etc., or their mixtures. The acidic catalyst for use for this purpose includes oxalic acid, hydrochloric acid, maleic acid, etc.

The unvulcanized nitrile rubber for use in the present invention is any one of various commercially available nitrile rubbers including those with an extremely high nitrile content (nitrile content: 43% or more), a high nitrile content (nitrile content: 36 to 42%), an intermediate-high nitrile content (nitrile content: 31 to 35%), an intermediate nitrile content (nitrile content: 25 to 30%) and a low nitrile content (nitrile content: 24% or less). Preferable is a nitrile rubber with an intermediate-high nitrile content.

The chlorinated polyethylene for use in the present invention is preferably that of high chlorination type with a chlorine content of about 60 to about 70%.

In the present invention, the above-mentioned components are used in the following proportions on the basis of 100 parts by weight of phenolxylylene resin or phenolbiphenyl resin:

| | |
|---|---|
| Resol-type phenol resin: | about 10 to about 1,000 parts by weight, preferably about 20 to about 400 parts by weight |
| Novolak-type phenol resin: | 0 to 1,000 parts by weight, preferably 0 to 100 parts by weight |
| Unvulcanized nitrile rubber: | 10 to 1,000 parts by weight, preferably 20 to 300 parts by weight |
| Chlorinated polyethylene: | 10 to 500 parts by weight, preferably 10 to 200 parts by weight |

When the resol-type phenol resin or said resin and the novolak-type phenol resin are in a proportion of more than about 1,000 parts by weight each, the adhesion durability to flon or water is lowered, whereas when the resol-type phenol resin is in a proportion of less than about 10 parts by weight the initial adhesiveness with the metal is lowered. When the unvulcani-zed nitrile rubber is used in a proportion of more than 1,000 parts by weight, the adhesiveness with the metal is lowered and also the viscosity is much increased, causing troubles of application work, whereas in a proportion of less than 10 parts by weight the compatibility with the nitrile rubber as an adhesion counterpart is lowered, resulting in an adhesion failure. When the chlorinated polyethylene is in a proportion of more than 500 parts by weight, the adhesion layer becomes brittle, resulting in a decrease in the strength, whereas in a proportion of less than 10 parts by weight, the reactivity with the rubber is lowered, resulting in poor adhesiveness.

The vulcanizable adhesive composition comprising these components as essential components can be prepared in a liquid state by dissolving the components into a single organic solvent such as a ketone (e.g. methyl ethyl ketone, methyl isobutyl ketone, etc.) or an aromatic hydrocarbon (e.g. toluene, xylene, etc.) or a mixture thereof to make a solid concentration of 3 to 10 wt. %.

Vulcanization adhesion of the present vulcanizable adhesive composition comprising the above-mentioned components is carried out by applying the vulcanizable adhesive composition to a metal such as mild steel, stainless steel, aluminum, aluminum die cast, brass, zinc, etc., generally to a metal plate, followed by air drying at room temperature and drying at about 100° to about 200° C. for about 5 to about 30 minutes, bringing an unvulcanized, compounded (hydrogenated) nitrile rubber in contact therewith, and pressure vulcanizing at about 150° to about 200° C., i.e. vulcanization temperature of the (hydrogenated) nitrile rubber.

BEST MODES FOR CARRYING OUT THE INVENTION

The present invention will be described below, referring to Examples, where amounts are shown by parts by weight, and amounts in parentheses are shown by parts by weight of solid matters.

EXAMPLE 1

| | |
|---|---|
| Phenolxylylene resin (MR-7800, a product of Meiwa Kasei Co., Ltd; solid content: 70%) | 143(100) |
| Resol-type phenol resin (AF-2639L, a product of Dainippon Ink & Chemicals, Inc.; solid content: 60%) | 67(40) |
| Unvulcanized nitrile rubber (N-237, a product of Japan Synthetic Rubber Co., Ltd.) | 40 |
| Chlorinated polyethylene (Z-200, a product of Daiso Co., Ltd., Chlorine content: 67%) | 20 |
| Methyl ethyl ketone | 1865 |
| Toluene | 1865 |

EXAMPLE 2

| | |
|---|---|
| Phenolxylylene resin (MR-7800) | 143(100) |
| Cresol-modified novolak-type phenol resin (KA-1053L, a product of Dainippon Ink & Chemicals, Inc.; solid content: 40%) | 20(8) |
| Resol-type phenol resin (AF-2639L) | 53(32) |
| Unvulcanized nitrile rubber (N-237) | 40 |
| Chlorinated polyethylene (Z-200) | 20 |
| Methyl ethyl ketone | 1862 |
| Toluene | 1862 |

EXAMPLE 3

| | |
|---|---|
| Phenolbiphenyl resin (MR-7851, a product of Meiwa Kasei Co., Ltd.; solid content: 70%) | 143(100) |
| Resol-type phenol resin (AF-2639L) | 67(40) |
| Unvulcanized nitrile rubber (N-237) | 40 |
| Chlorinated polyethylene (Z-200) | 20 |
| Methyl ethyl ketone | 1865 |
| Toluene | 1865 |

EXAMPLE 4

| | |
|---|---|
| Phenolbiphenyl resin (MR-7851) | 143(100) |
| Cresol-modified novolak-type phenol resin (KA-1053L) | 20(8) |
| Resol-type phenol resin (AF-2639L) | 53(32) |
| Unvulcanized nitrile rubber (N-237) | 40 |
| Chlorinated polyethylene (Z-200) | 20 |
| Methyl ethyl ketone | 1862 |
| Toluene | 1862 |

COMPARATIVE EXAMPLE 1

| | |
|---|---|
| Resol-type phenol resin (AF-2639L) | 167(100) |
| Unvulcanized nitrile rubber (N-237) | 28 |
| Chlorinated polyethylene (Z-200) | 14 |
| Methyl ethyl ketone | 916 |
| Toluene | 916 |

COMPARATIVE EXAMPLE 2

| | |
|---|---|
| Resol-type phenol resin (AF-2639L) | 167(100) |
| Cresol novolak-type epoxy resin (Epikron N695, a product of Dainippon Ink & Chemicals, Inc.) | 40 |
| Unvulcanized nitrile rubber (N-237) | 40 |
| Chlorinated polyethylene (Z-200) | 20 |
| Methyl ethyl ketone | 1867 |
| Toluene | 1867 |

COMPARATIVE EXAMPLE 3

| | |
|---|---|
| Cresol-modified novolak-type phenol resin (KA-1053L) | 250(100) |
| Resol-type phenol resin (AF-2639L) | 167(100) |
| Unvulcanized nitrile rubber (N-237) | 68 |
| Chlorinated polyethylene (Z-200) | 29 |
| Methyl ethyl ketone | 2618 |
| Toluene | 2618 |

COMPARATIVE EXAMPLE 4

Chlorinated Rubber-based Adhesive (Chemlok 252X, a Product of Rhode Far East Co.)

Vulcanizable adhesive compositions comprising the foregoing components of Examples 1 to 4 and Comparative Examples 1 to 4 were applied to zinc phosphate-treated mild steel sheets, respectively, air dried while being left standing at room temperature for 10 minutes and then subjected to baking treatment at a baking temperature of 150° C. for 10 minutes.

Unvulcanized hydrogenated nitrile rubber compounds of the following Composition 1 to 3 (unit: parts by weight) were brought into contact with the vulcanizable adhesive-baked mild steel sheets, respectively, and subjected to pressure vulcanization at 180° C. for 6 minutes. The resulting vulcanization adhesion products were subjected to an initial adhesiveness test, a water resistance test, a PAG resistance test and a flon resistance test.

| | |
|---|---|
| Initial adhesiveness test: | JIS K6256 90° peeling test |
| Water resistance test: | JIS K6256 90° peeling test pieces are dipped in warm water at 80° C., and, 100 hours after the dipping, subjected to the peeling test |
| PAG resistance test: | JIS K6256 90° peeling test pieces are dipped in PAG (polyalkylene glycol) oil at 150° C. and, 100 hours after the dipping, subjected to the peeling test |
| Flon resistance test: | A sample obtained by pressure vulcanization molding of a 0.5 mm-thick rubber sheet on an adhesive-coated metal plate for JIS K6256 90° peeling is placed in a pressure vessel, into which a flon gas (R134a) is injected. After being left standing in the circumstances at 40° C. for 24 hours, the sample is taken out of the vessel and heated in an oven at 150° C. for one hour. Number of foaming points generated on the adhesion boundary by the flon gas is to be counted |

(Hydrogenated nitrile rubber Compositions 1 to 3)

| | Composition 1 | Composition 2 | Composition 3 |
|---|---|---|---|
| HNBR (Zetpol 2020 a product of Nippon Zeon Co., Ltd.; CN36%) | 100 | 100 | |
| HNBR (Zetpol 1020, a product of Nippon Zeon Co., Ltd.; CN44%) | | | 100 |
| N990 carbon black | 10 | 140 | |
| SRF carbon black | | | 51 |
| White carbon (Specific surface area 70 m²/g) | 60 | | |
| Zinc oxide | 5 | 5 | 5 |
| Stearic acid | 0.5 | 0.5 | 0.5 |
| Diphenylamine-based antioxidant (Nocrack CD, a product of Ouchi-Shinko Kagaku K.K.) | 1.5 | 1.5 | 0.5 |
| Imidazole-based antioxidant (Nocrack MB, a product of Ouchi-Shinko Kagaku K.K.) | 1.5 | 1.5 | 2 |
| 1,3-di(t-butylperoxyisopropyl) benzene (concentration 40%) (Peroxymon F40, a product of NOF Corp.) | 10 | 10 | 10 |
| Adipic acid-based plasticizer (RS107, a product of Asahi Denka Kogyo K.K.) | 10 | 10 | 2 |
| Vinyl silane compound (A151, a product of Nippon Unicar Co., Ltd.) | 2 | | |
| Processing aid (Vestenemar 8012, a product of Huels Co., Ltd.) | | 5 | 5 |

The results are shown in the following Tables 1 to 3.

TABLE 1

(Compound 1)

| | Example | | | | Comp. Ex. | | | |
|---|---|---|---|---|---|---|---|---|
| | 1 | 2 | 3 | 4 | 1 | 2 | 3 | 4 |
| [Initial adhesiveness test] | | | | | | | | |
| Adhesion strength (N/mm) | 18.8 | 18.8 | 18.6 | 18.9 | 8.8 | 6.5 | 18.8 | 18.9 |
| Percent rubber retaining (%) | 100 | 100 | 100 | 100 | 10 | 0 | 100 | 100 |
| [Water resistance test] | | | | | | | | |
| Adhesion strength (N/mm) | 18.5 | 18.5 | 18.5 | 18.5 | — | — | 18.5 | 10.1 |
| Percent rubber retaining (%) | 100 | 100 | 100 | 100 | — | — | 100 | 0 |
| [PAG resistance test] | | | | | | | | |
| Adhesion strength (N/mm) | 17.5 | 17.5 | 17.5 | 17.5 | — | — | 17.5 | 16.5 |
| Percent rubber retaining (%) | 100 | 100 | 100 | 100 | — | — | 100 | 80 |
| [Flon resistance test] | | | | | | | | |
| Number of foaming points | 0 | 0 | 0 | 0 | — | — | 6 | 20 |

TABLE 2

(Compound 2)

| | Example | | | | Comp. Ex. | | | |
|---|---|---|---|---|---|---|---|---|
| | 1 | 2 | 3 | 4 | 1 | 2 | 3 | 4 |
| [Initial adhesiveness test] | | | | | | | | |
| Adhesion strength (N/mm) | 17.9 | 18.1 | 17.9 | 17.8 | 17.8 | 17.7 | 17.9 | 17.9 |
| Percent rubber retaining (%) | 100 | 100 | 100 | 100 | 100 | 100 | 100 | 100 |
| [Water resistance test] | | | | | | | | |
| Adhesion strength (N/mm) | 17.5 | 17.3 | 17.1 | 17.3 | 11.1 | 17.1 | 17.5 | 8.5 |
| Percent rubber retaining (%) | 100 | 95 | 100 | 90 | 20 | 70 | 70 | 0 |
| [PAG resistance | | | | | | | | |

TABLE 2-continued (Compound 2)

| | Example | | | | Comp. Ex. | | | |
|---|---|---|---|---|---|---|---|---|
| | 1 | 2 | 3 | 4 | 1 | 2 | 3 | 4 |
| test] | | | | | | | | |
| Adhesion strength (N/mm) | 17.5 | 17.5 | 17.5 | 17.5 | 17.3 | 16.5 | 17.5 | 16.5 |
| Percent rubber retaining (%) [Flon resistance test] | 100 | 100 | 100 | 100 | 100 | 90 | 100 | 70 |
| Number of foaming points | 0 | 0 | 0 | 0 | 3 | 7 | 5 | 15 |

TABLE 3

(Compound 3)

| | Example | | | | Comp. Ex. | | | |
|---|---|---|---|---|---|---|---|---|
| | 1 | 2 | 3 | 4 | 1 | 2 | 3 | 4 |
| [Initial adhesiveness test] | | | | | | | | |
| Adhesion strength (N/mm) | 17.1 | 17.2 | 17.1 | 17.3 | 17.0 | 17.2 | 17.2 | 17.2 |
| Percent rubber retaining (%) [Water resistance test] | 100 | 100 | 100 | 100 | 100 | 100 | 100 | 100 |
| Adhesion strength (N/mm) | 16.9 | 16.8 | 16.9 | 16.9 | 14.5 | 15.9 | 15 | 6.5 |
| Percent rubber retaining (%) [PAG resistance test] | 100 | 100 | 100 | 100 | 50 | 80 | 60 | 0 |
| Adhesion strength (N/mm) | 17 | 16.8 | 16.9 | 16.9 | 16.4 | 16.9 | 16.9 | 12 |
| Percent rubber retaining (%) [Flon resistance test] | 100 | 100 | 100 | 100 | 90 | 100 | 100 | 60 |
| Number of foaming points | 0 | 0 | 0 | 0 | 1 | 3 | 6 | 10 |

INDUSTRIAL UTILITY

In the vulcanization adhesion between a metal and (hydrogenated) nitrile rubber, the present vulcanizable adhesive composition is effectively applied to (hydrogenated) nitrile rubber with a nitrile content of 18 to 48%, and has a suppression effect on a decrease in the adhesiveness even if exposed to a flon gas or dipped in polyalkylene glycol or water for a long time. Integrated seal parts made up of a metal and (hydrogenated) nitrile rubber, as vulcanization adhered to each other by the present vulcanizable adhesive composition can be effectively used as cryogenic liquid seals, etc.

The invention claimed is:

1. A vulcanizable adhesive composition for use in providing vulcanization adhesion between a metal and nitrile rubber with a nitrile content of 18 to 48% or between a metal and a hydrogenated nitrile rubber with a nitrile content of 18 to 48%, said vulcanizable adhesive composition, comprising 100 parts by weight of methylol group-containing phenolxylylene resin as a polycondensation product between 1,4-bis(alkoxymethyl)benzene and phenol having at least one methylol group at the 2,4-positions or methylol group-containing phenolbiphenyl as a polycondensation product between 4,4'-bis(alkoxymethyl)bisphenyl and phenol having at least one methylol group at the 2,4-positions, 10 to 1,000 parts by weight of resol-type phenol resin, 0 to 1,000 parts by weight of novolak-type resin, 10 to 1,000 parts by weight of unvulcanized nitrile rubber and 10 to 500 parts by weight of chlorinated polyethylene.

2. A vulcanizable adhesive composition according to claim 1, as prepared in the form of an organic solvent solution.

3. An integrated seal element which comprises a metal and nitrile rubber or a metal and hydrogenated nitrile rubber, adhered together by vulcanization of the vulcanizable adhesive composition according to claim 1.

4. An integrated seal element which comprises a metal and nitrile rubber or a metal and hydrogenated nitrile rubber that are adhered together by vulcanization of the vulcanizable adhesive composition according to claim 1, wherein an adhesive characteristic of the composition is resistant to cryogenic fluids.

5. An integrated seal element which comprises a metal and nitrile rubber or a metal and hydrogenated nitrile rubber adhered together by vulcanization of the vulcanizable adhesive composition according to claim 2.

6. An integrated seal element which comprises a metal and nitrile rubber or a metal and hydrogenated nitrile rubber that are adhered together by vulcanization of the vulcanizable adhesive composition according to claim 2, wherein an adhesive characteristic of the composition is resistant to cryogenic fluids.

7. In a sealing element used to provide a seal against cryogenic fluids, the improvement wherein the sealing element comprises a metal and nitrile rubber or a metal and hydrogenated nitrile rubber that are adhered together by vulcanization of the vulcanizable adhesive composition according to claim 1.

8. In a sealing element used to provide a seal against cryogenic fluids, the improvement wherein the sealing element comprises a metal and nitrile rubber or a metal and hydrogenated nitrile rubber that are adhered together by vulcanization of the vulcanizable adhesive composition according to claim 2.

* * * * *